United States Patent [19]
Meadows

[11] Patent Number: 5,592,095
[45] Date of Patent: Jan. 7, 1997

[54] CHARGE MEASUREMENT CIRCUIT FOR A BATTERY IN WHICH OSCILLATORS ARE USED TO INDICATE MODE OF OPERATION

[75] Inventor: Vernon Meadows, Lilburn, Ga.

[73] Assignee: Motorola, Inc., Schaumburg, Ill.

[21] Appl. No.: 520,362

[22] Filed: Aug. 28, 1995

[51] Int. Cl.⁶ ................................................ G01R 27/26
[52] U.S. Cl. ..................... 324/436; 324/433; 324/120; 320/48; 340/636
[58] Field of Search ........................... 324/433, 427, 324/436, 120; 340/636, 825.44; 320/21, 48

[56] References Cited

U.S. PATENT DOCUMENTS

| | | | |
|---|---|---|---|
| 2,672,284 | 3/1954 | Dickinson | 324/120 |
| 3,550,105 | 12/1970 | Cola | 324/436 |
| 3,581,203 | 5/1971 | Flower | 324/120 |
| 3,631,342 | 12/1971 | McDonald | 324/120 |
| 4,161,691 | 7/1979 | Vermeers | 324/120 |
| 4,194,146 | 3/1980 | Patry et al. | 320/48 |
| 4,673,862 | 6/1987 | Wahlstrom | 320/48 |
| 5,065,084 | 11/1991 | Oogita | 320/48 |
| 5,128,610 | 7/1992 | Watson | 324/120 |
| 5,434,508 | 7/1995 | Ishida | 324/427 |
| 5,477,129 | 12/1995 | Myslinski | 324/436 |

FOREIGN PATENT DOCUMENTS 0075276  4/1986  Japan ..................... 324/436

*Primary Examiner*—Maura K. Regan
*Attorney, Agent, or Firm*—Scott M. Garrett; Kenneth M. Massaroni

[57] ABSTRACT

A battery pack (10) has a charge measurement circuit (12) for estimating the state of charge during use. The charge measurement circuit (12) includes a sense resistor (24), amplifier (26), at least one oscillator (28), counter (30), and a communications circuit (32). The battery pack powers a host device (16), which has a limited number of modes of operation, each mode requiring a different current level. The number of oscillators (28) equals the number of modes of operation of the host device (16). As current is drawn from the battery cells (18), the sense resistor (24) and amplifier (26) act to convert the current to a voltage level. The voltage level is fed to each oscillator (28) present. Each oscillator (28) provides a clock signal at a frequency corresponding to one mode of operation of the host device, and is activated when the voltage level is within a preselected range. The clock signal is fed to a counter (30), which counts at a rate determined by the frequency of the active oscillator (28). The host device (16) can request the current count value from communications circuit (30) to estimate the state of charge of the battery cells (18).

12 Claims, 1 Drawing Sheet

CHARGE MEASUREMENT CIRCUIT FOR A BATTERY IN WHICH OSCILLATORS ARE USED TO INDICATE MODE OF OPERATION

TECHNICAL FIELD

This invention relates in general to rechargeable battery packs, and more particularly to rechargeable battery packs having circuitry for determining the state of charge of the battery pack.

BACKGROUND

As electronics technologies become increasingly integrated, a wider variety of portable electronic devices is enabled. A critical associated technology allowing portability is energy storage, particularly, battery technology. Without an energy source, portable devices are useless. The main concerns with regard to portable devices for any battery or battery pack are physical size, weight, energy capacity, and predictable behavior. In general, it would be desirable to have a small, lightweight, high capacity battery, and while small size and light weight generally go together, the two are at odds with battery capacity. In general, the larger the battery, the higher the capacity. The designers of a portable system must make a compromise between size and capacity, although newer chemistries are allowing for smaller batteries with higher capacities. In fact there is currently a great deal of work being done to improve battery capacity. However, predicting the life of the battery while it is powering a portable device is difficult, at best.

Since batteries have a finite energy capacity, the user of a portable device runs the risk of having the battery suddenly running out of power in the absence of some means to recognize a low capacity condition. Measuring the remaining battery capacity in a battery during use is not as straight forward as measuring the fuel level in an automobile. Battery parameters are fraught with non-linearities, as is well documented in the art. For example, the voltage of a battery is affected by the amount of current being provided (or accepted), the temperature of the battery, the age of the battery, the specific chemical recipe used, the state of charge of the battery, and the ratio of the battery current to the battery capacity, to name a few.

Accordingly, early attempts to warn a user of a low capacity condition based on only one or two parameters were unreliable. Methods such as observing the battery voltage until it dropped to a preselected threshold would work well under the right conditions, but were grossly inaccurate under less favorable conditions. This typically was not seen as a great disadvantage at first, since the complexity of the portable devices was, by comparison, very low. However, with the proliferation of computers into the portable realm, it has become increasingly necessary to have a reliably precise method to measure battery capacity. For example, a portable computer user must be warned when the battery is going to run out so that any work in progress may be saved. In addition to a warning, users would like to know the relative capacity of a battery. For example, a user may have several batteries for a given device. If the batteries are in unknown states of charge, i.e. they were not just recharged, it is impossible to tell which battery will give the longest period of operation.

In response, the market has demanded more precision from the manufacturers in determining remaining battery capacity, as well as a state of charge indicator. Many manufacturers have responded to the market with what is commonly referred to as a smart battery. One of the first attempts to make an ultra-precise measurement of the remaining capacity of a battery involved measuring the current through the battery and integrating the current flow with respect to time. This method uses a counter keeps track of the integrated value, and provides the portable device with a count upon request from the device. This method requires a stable, accurate time keeping method, as well as a very precise means for measuring current. It is the basis for virtually all current smart battery circuits. Some improvements have been made, such as including a microprocessor programmed to adjust the integrated value based on temperature and other conditions. In some instances the software developed for these more advanced battery packs is complex. Accordingly, the smart battery has met with some success in the marketplace. However, the precision provided by this method comes at a significant cost, occasioned by the need for additional circuitry.

Since batteries are an accessory manufactured for a portable device, they are expected to come at as low a cost as possible. Customers may be willing to spend a little more money for a given device based on some unique features, but rarely for the associated battery. In response, many device manufacturers offer both smart and regular batteries for their products, and leave the decision up to the consumer. However, manufacturers have failed to recognize that the ultra-precision of the current smart batteries is more than required by the typical consumer. For example, consumers know to refill their automobile fuel tanks when the indicator drops to a low level. An indicator that would tell them there were 1.234 gallons left is not necessary. While battery parameters may be non-linear, a reasonable estimation of capacity is still possible. Therefore there exists a need for a reliable state of charge indicator that is also cost effective.

DETAILED DESCRIPTION OF THE PREFERRED EMBODIMENT

Figure 1:
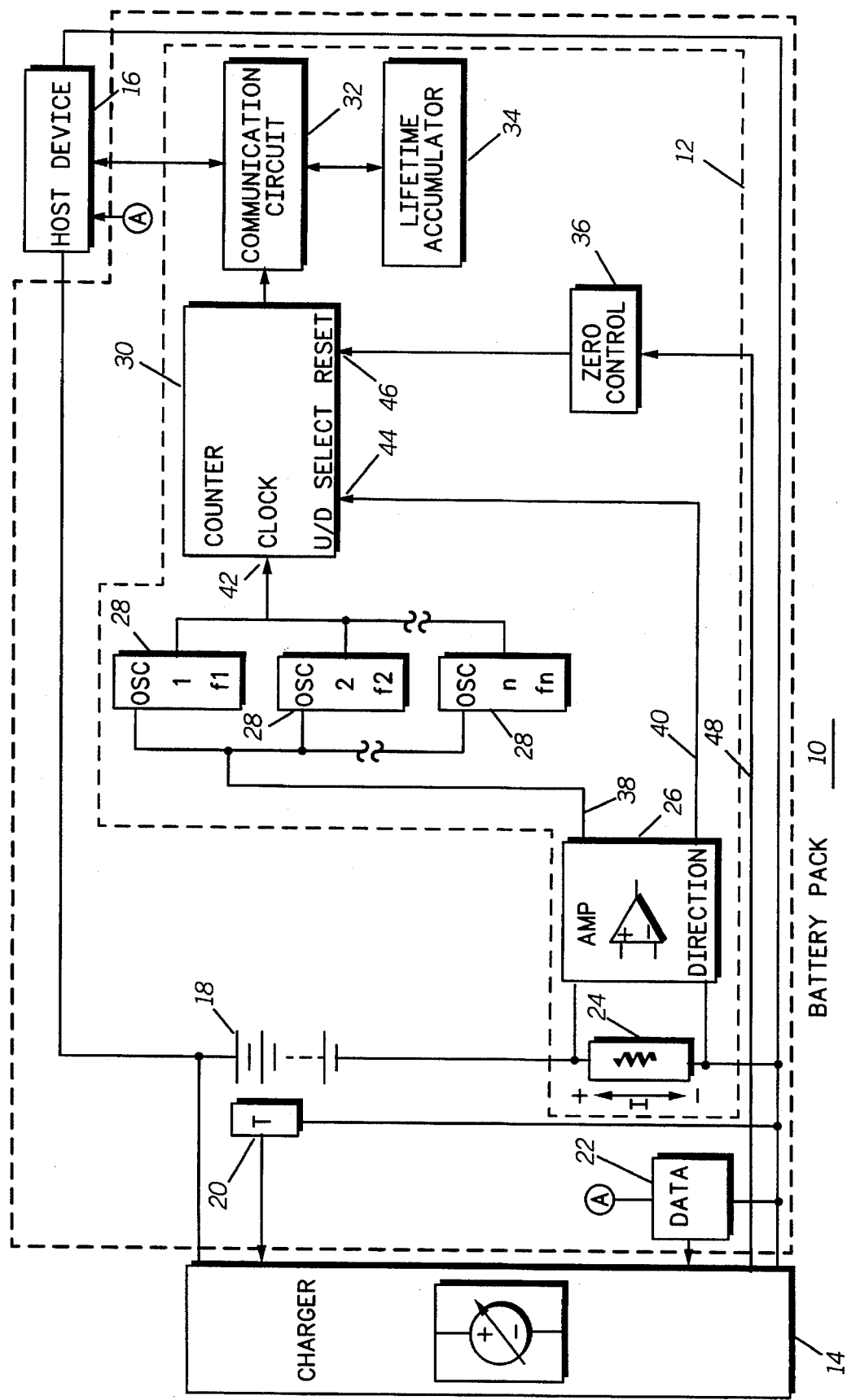
FIG. 1 is a block diagram of a battery pack having a charge measurement circuit in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a block diagram of a battery pack 10 having a charge measurement circuit 12 in accordance with the instant invention. The battery pack 10 is connectable to a battery charger 14, and powers a host device 16. The charger 14 provides voltage and current to recharge battery cells 18, of which there is at least one. The host device 16 is a portable electrical device such as a computer or cellular phone, and may include charger 14 as an integral component. When charger 14 and host device 16 are separate devices, battery pack 10 is generally connected to charger 14 only when recharging is necessary.

The battery pack further includes a temperature sensing element 20, such as a thermistor or other means for sensing temperature. The temperature sensing element 20 is located proximally to the battery cells, and provides the charger with an electrical signal indicative of the battery cells' temperature. The use of such temperature sensing elements in battery packs for charging is well known in the art. A data storage device 22 may be included, and is used for storing information such as charging parameters, chemistry information, charging instructions, etc. The use of such memory storage devices is known in the art, and they typically comprise a EEPROM or other non-volatile memory.

The charge measurement circuit 12 comprises sense resistor 24, amplifier 26, at least one oscillator 28, a counter 30, and a communication circuit 32. Additionally, a lifetime accumulator 34 and zero control 36 may be included. The sense resistor 24 and amplifier 26 provide a means for converting current through the battery cells to a proportional voltage level. This is accomplished by connecting sense resistor 24 in series with the battery cells 18 so that any current through the battery cells 18 goes through the sense resistor 24. The sense resistor 24 has a low level of resistance so as to have a negligible effect on power delivery of the battery pack 10, and is typically in the range of 0.01 ohms to 1 ohm. In a typical application the value of the sense resistor 24 is chosen so that a maximum of about 200 millivolts is produced under maximum expected current delivery conditions. This low level voltage signal has a magnitude proportional to the magnitude of the current, and a polarity depending on the direction of the current. Amplifier 26 is connected across the sense resistor, and amplifies the magnitude of the low level voltage signal to provide a voltage level proportional to the current through the battery cells. However, in some systems the current range used by the host device 16 may be quite large, and in such cases the amplifier 26 would be a logarithmic amplifier. The voltage level output from the amplifier 26 would then be proportional to the log of the current. In either case, the voltage level is provided at a voltage output 38, and converts the range of the low level voltage signal of 0–200 mV to a range which is easier to work with, such as 0–5 volts. A bistable output 40 is used to provide a signal indicative of the polarity of the low level voltage signal, and hence the direction of the current through the battery cells 18. Since there are only two choices for polarity, positive or negative, the bistable output 40 provides a bistable signal having first and second levels, such as a digital 1 or 0.

The voltage output of the amplifier is connected to the input of at least one oscillator 28, and where more than one oscillator 28 is used, the output 38 is connected to the input of each oscillator 28. The oscillator 28 comprises a digital clock oscillating circuit, such as an astable multivibrator, and provides a clock signal at a preselected frequency when the voltage level provided by the amplifier 26 is within a preselected range. Clock signals are commonly used in computer applications, and are composed of regular pulses. That is, repetitive digital pulses of identical duration occurring at regular time intervals. When multiple oscillators 28 are present, each provides a different frequency clock signal, and is activated by an exclusive range of the voltage level output from amplifier 26. For example, in a circuit having 3 oscillators 28, the first would provide a frequency of 1 Hz when the amplifier provides 1–2 volts, the second would provide a frequency of 2 Hz for an input of 2.5–3.5 volts, and the third would provide a clock signal at 5 Hz for an input of 4–5 volts. A more detailed design example is described hereinbelow. The preferred circuit for oscillator 28 comprises a standard astable circuit, such as a 555 timer configured in a astable mode, and a comparator circuit for enabling the timer. The comparator circuit samples the voltage level output of the amplifier 26, and provides the enabling signal when the voltage level is within the preselected range. The comparator circuit and timer circuits are well known in the art, and are used in an enormous variety of applications.

The discrete steps in clock signal frequency correspond to various operating modes of the host device 16, and to charge currents provided by charger 14. Since the host device 16 typically has only a few operating modes, such as talk, standby, and off for a cellular phone, each mode requires a certain current level. These different levels are about the same from one host device to another, such as two identical cellular phones. Each phone will require about the same level of current to talk, and each phone will require about the same current to wait for a call in standby. In effect, the operating mode of the host device 16 and charger 14 are converted into a polarity indicator, such as bistable output 40 of the amplifier, and a clock signal whose frequency corresponds to the instant operation mode of the host device 16

These two parameters are fed to counter 30, which is preferably an up/down counter having CLOCK input 42, U/D SELECT input 44, and RESET input 46, as is common on commercially available up/down counters. The CLOCK input is connected to the output of the oscillator 28, and where more than one oscillator is used, the outputs of the oscillators are connected common with each other. The counter 30 maintains a count value and adjusts the count by 1 for every pulse received from the oscillator. The U/D SELECT input is connected to the bistable output 40 of the amplifier 26, and causes counter 30 to increase the count when receiving a pulse when the bistable output 40 is at the first level, and decreases the count when receiving a pulse when the bistable output 40 is at the second level. RESET 46 is connected either to zero control 36, or more preferably, directly to charger 14. When the charger 14 has finished recharging the battery pack 10, it sends a reset signal on line 48 which causes the counter to reset itself to an initial state. Zero control 36, if included, would provide buffering of the signal on line 48.

In a simple system it is not necessary for counter 30 to be an up/down type, only a resetable one. As current is drawn from the battery pack 10 by the host device 16, the various oscillators 28 will cause the counter 30 to count accordingly. Once the battery pack is connected to the charger 14, the charger 14 provides enough current to power the host device 16 while charging the battery pack 10. As such, the host device 16 is not in danger of running out of power, and does not need to determine the battery state of charge. Once the charger has finished recharging it sends the reset signal, as before, causing the counter to start from the initial state. All current provided by the battery pack is counted from that point. Since the charger would have finished charging, it no longer would provide power so the host device would then begin to draw current from the battery.

Since the count changes according to the frequency of the clock signal received from oscillator 28, the count value is indicative of the energy state of the battery cells 18. Where the host device 16 has more than one operation mode, and more than one oscillator is used, the count changes at different rates corresponding to the different modes. The count value is analogous to the fuel gauge needle of an automobile, it represents a general energy state. The cost associated with precise measurement circuits and microprocessors has been eliminated in favor of a simpler circuit that provides an accurate estimation.

The following example illustrates generally how the invention is practiced. For the example, the host device 16 shall be a cellular telephone having two modes of operation;

talk and standby. In talk mode the phone draws about 300 mA, and in standby about 30 mA. These values will change slightly from phone to phone, as well as over temperature. The battery pack 10 has battery cells 18 with 500 mAh capacity, which means if fully charged, it could provide 500 mA for one hour before reaching a fully discharged state. The value of the sense resistor 24 is chosen to minimize voltage drop, and still provide enough low level voltage signal for amplifier 26. The choice is somewhat arbitrary, and is governed as much by performance as other factors such as commercial availability. For this example the value of 0.2 ohms is sufficient. Typically a resistor used for current sensing has a tolerance of about 1%. Accordingly, when the phone is in standby mode a voltage of about 6 mV is produced across the sense resistor, and in talk mode a voltage of about 60 mV is produced. The next step is to choose the gain factor of the amplifier 26. The highest current mode should produce a high voltage level output from the amplifier. Therefore in talk mode a voltage level of about 4.5 V would be the most convenient for the design. The gain is then 4.5 V/60 mV=75. Accordingly, when the phone is in standby, the voltage level provided by the amplifier 26 is 75×6 mV=0.45 V.

The next step is to design the oscillators 28. Since there are two modes of operation, two oscillator will be used. First the clock frequency of each must be determined. Since the battery has a 500 mAh capacity, it would take the phone 500/300=1.67 hours to reach a fully discharged state from a fully charged state in talk mode. To determine the frequency for the oscillators, the maximum count must be known. For convenience, assume that the counter is a 16 bit counter, and therefore can produce 32,768 increments, and that this will be the maximum count. Therefore at the highest discharge rate, 300 mA, the counter should increment 32,768 time in 1.67 hours, or 32,768 times in 6012 seconds, that yields a frequency of 5.45 Hz. Accordingly, the standby oscillator will have a frequency of 0.545 Hz.

To account for tolerances and minor variations, the talk mode oscillator will be set to activate when the input voltage level has a 5% maximum deviation from the nominal of 4.5 volts, yielding a range of 4.275–4.725 volts, while the standby oscillator will have a range of 0.4275–0.4725 volts. This will yield a maximum of 5% error in the count value which is greater than the error produce by component tolerances and variations in current draw of the phone. 1 part out of 20 is, in most cases, a reasonable and acceptable estimation error for this type of "fuel" gauging.

The count value, or simply count, is fed to the communications circuit 32 which buffers and latches the count. The communication circuit 32 communicates with the host device 16, and sends or communicates the count to the host device 16 either at regular intervals, or upon request from the host device. Once the count has been received, the host device 16 estimates the battery state of charge by comparing the count with a predetermined maximum count. The maximum count value could be stored with the battery pack in data storage device 22. The host device 16 can then process the count into a display for the user, such as an LED bargraph. If more precision is required, the microprocessor of the host device 16 may be programmed to modify the count by compensating for temperature, current rate, etc. In this way the cost of a microprocessor is not realized twice, as in previous charge measurement circuits for battery packs.

For additional convenience, lifetime accumulator 34 may be included in the charge measurement circuit 12. It would be connected to communications circuit 32 and receive the same information as the communications circuit 32. The lifetime accumulator 34 comprises a counter similar to counter 30, but only counts pulses indicating discharge of the battery cells 18 to accumulate a total lifetime pulse count. Manufacturers typically warranty battery packs based on the number of charge-discharge cycles it should provide, but this is difficult to translate into actual values since users typically recharge a battery before it is fully discharged, resulting in a partial discharge. As a result, manufacturers typically provide warranty coverage for a period of time which roughly corresponds to the expected number of cycles or cycle life resulting from average use. Heavy use of the battery will result in exceeding the cycle life before the warranty period, while infrequent use results in the warranty period expiring before the cycle life is reached.

The typical number of cycles expected from normal use of a battery pack is about 500. Using the example above then, a 500 mAh battery could be expected to provide, over its life, 500 discharges×500 mAh=250000 mAh. The lifetime accumulator provides a way to measure all discharge time, independent of cycles. Both partial discharges and over discharges would be reflected in the lifetime count. The lifetime count could then be used by the manufacturer to control warranty claims, extending warranty coverage to users who infrequently use the battery, and more accurately controlling warranty costs.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A charge measurement circuit for a battery pack having at least one battery cell, comprising:

means for converting current through said at least one battery cell to a voltage level;

a plurality of oscillators connected to said means for converting, each of said oscillators providing a dock signal comprised of regular pulses at a different preselected frequency corresponding to an operating mode of a host device in response to said voltage level being within a corresponding exclusive range;

means for generating a count of said pulses connected to said at least one oscillator, said means for generating a count being reset to an initial state in response to said at least one battery cell being recharged; and means for communicating said count to a host device.

2. A charge measurement circuit as recited in claim 1, wherein said means for converting comprises:

a sense resistor coupled in series with said at least one battery cell for providing a low level voltage signal proportional to said current; and an amplifier connected across said sense resistor for amplifying said low level voltage signal, thereby providing said voltage level.

3. A charge measurement circuit as recited in claim 2, wherein:

said low level voltage signal has a polarity and a magnitude, said voltage level is provided by said amplifier proportional only to said magnitude, said amplifier further provides a bistable output having a first level and a second level indicative of said polarity; and said means for generating a count is an up/down counter having a CLOCK input, U/D SELECT input, and a RESET input, said CLOCK input for receiving said pulses, said U/D SELECT input connected to said bistable output of said amplifier, said RESET input for resetting said up/down counter to said initial state in response to a reset signal from a charger, said up/down counter for maintaining a count of said pulses and increasing said count when said bistable output is at said first level and decreasing said count when said bistable output is at said second level.

4. A charge measurement circuit as recited in claim 1, further comprising an accumulator, connected to said means for communicating, for accumulating and storing a total lifetime pulse count, said total lifetime pulse count being provided to said host device through said means for communicating upon request from said host device.

5. A charge measurement circuit for a battery pack having at least one battery cell, said battery pack for powering a host device having plurality of operating modes, each said operating mode characterized by a unique current level, and being rechargeable in a charger, said charger providing a reset signal upon charging said battery pack, said circuit comprising:

a sense resistor coupled in series with said at least one battery cell for providing a low level voltage signal proportional to current through said at least one battery cell, said low level voltage signal having a magnitude and a polarity;

an amplifier connected across said sense resistor for amplifying said magnitude of said low level voltage signal, thereby providing a voltage level, and further providing a bistable output having a first level and a second level indicative of said polarity;

a plurality of oscillators connected to said means for converting, each of said oscillators providing a clock signal comprised of regular pulses at a different preselected frequency corresponding to one of said operating modes of said host device in response to said voltage level being within a corresponding exclusive range;

an up/down counter having CLOCK, U/D SELECT, and RESET inputs, said CLOCK input for receiving said pulses, said U/D SELECT input connected to said bistable output of said amplifier, said RESET input for resetting said up/down counter to an initial state in response to receiving said reset signal from said charger, said up/down counter for maintaining a count of said pulses and increasing said count when said bistable output is at said first level and decreasing said count when said bistable output is at said second level; and a communication circuit connected to said up/down counter for communicating said count to said host device.

6. A charge measurement circuit as defined in claim 5, further comprising an accumulator connected to said communication circuit for maintaining a total lifetime pulse count of pulses occurring when said bistable output is at said first level.

7. A charge measurement circuit as defined in claim 6, wherein said accumulator provides said total lifetime pulse count to said host device by means of said communication circuit upon request from said host device.

8. A battery pack for powering a host device having a plurality of operating modes each requiring a different level of current, said battery pack being rechargeable by a charger, said battery pack comprising:

at least one battery cell, said at least one battery cell having a temperature;

means for sensing temperature proximally located with said at least one battery cell for providing said charger with a signal indicative of said temperature of said at least one battery cell;

means for converting current through said at least one battery cell to a voltage level proportional to said current;

a plurality of oscillators connected to said means for converting, each of said oscillators providing a clock signal comprised of regular pulses at a different preselected frequency corresponding to one of said operating mode of said host device in response to said voltage level being within a corresponding exclusive range;

means for counting said pulses connected to said at least one oscillator, for maintaining a count of said pulses, said means for counting being reset to an initial state in response to said at least one battery cell being recharged; and means for communicating said count to a host device.

9. A battery pack as recited in claim 8, wherein said means for converting comprises:

a sense resistor coupled in series with said at least one battery cell for providing a low level voltage signal proportional to said current; and an amplifier connected across said sense resistor for amplifying said low level voltage signal, thereby providing said voltage level.

10. A battery pack as recited in claim 9, wherein:

said low level voltage signal has a polarity and a magnitude, said voltage level is provided by said amplifier proportional only to said magnitude, said amplifier further provides a bistable output having a first level and a second level indicative of said polarity; and said means for counting is an up/down counter having CLOCK, U/D SELECT, and RESET inputs, said CLOCK input for receiving said pulses, said U/D SELECT input connected to said bistable output of said amplifier, said RESET input for resetting said up/down counter to said initial state in response to a reset signal from a charger, said up/down counter for maintaining a count of said pulses and increasing said count when said bistable output is at said first level and decreasing said count when said bistable output is at said second level.

11. A battery pack as recited in claim 8, further comprising an accumulator, connected to said means for communicating, for accumulating and storing a total lifetime pulse count, said total lifetime pulse count being provided to said host device through said means for communicating upon request from said host device.

12. A battery pack as defined by claim 8, wherein said means for sensing temperature is a thermistor.

* * * * *

UNITED STATES PATENT AND TRADEMARK OFFICE
CERTIFICATE OF CORRECTION

PATENT NO. : 5,592,095
DATED : January 7, 1997
INVENTOR(S) : Vernon Meadows

It is certified that error appears in the above-indentified patent and that said Letters Patent is hereby corrected as shown below:

Column 6, Claim 1, line 40, "a dock" should read -- a clock --

Signed and Sealed this

Twenty-ninth Day of April, 1997

Attest:

BRUCE LEHMAN

Attesting Officer

Commissioner of Patents and Trademarks